Figure 1:
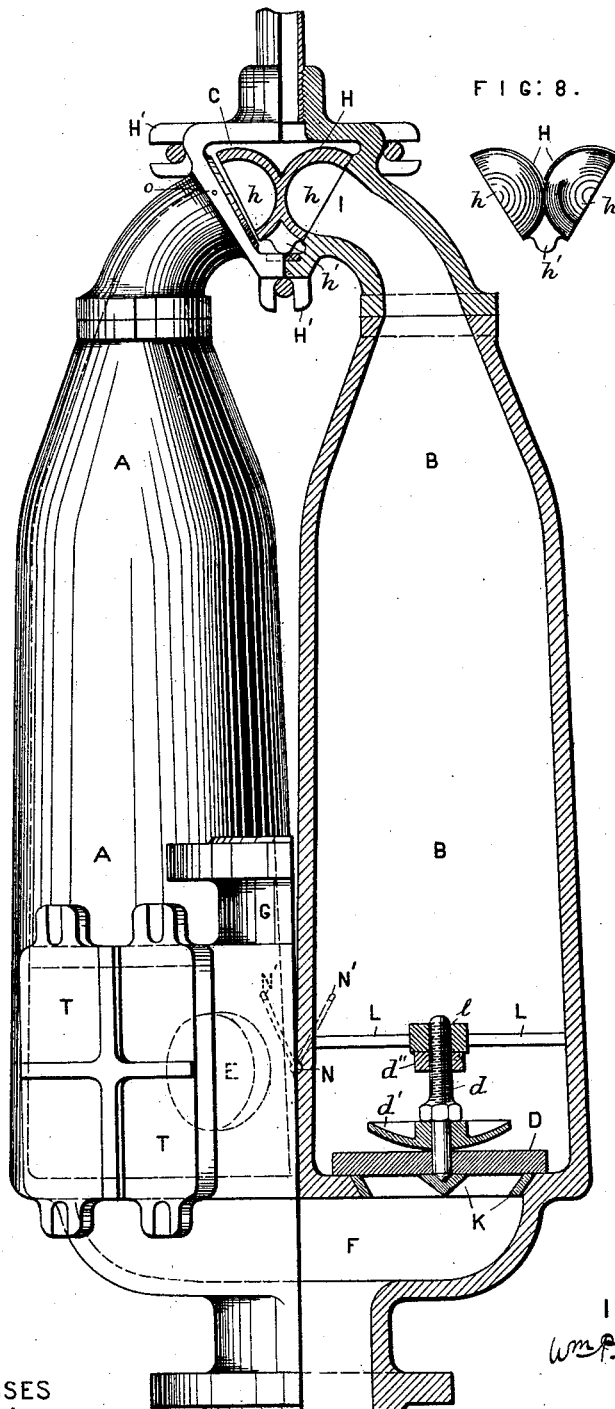

FIG: 2.

FIG: 3.

(No Model.) 6 Sheets—Sheet 4.
W. P. THEERMANN.
PULSATING STEAM PUMP.

No. 452,400. Patented May 19, 1891.

WITNESSES
William H. Taylor
Joseph Benton

INVENTOR
Wm. P. Theermann
by
Wm. P. Hampton & Co.
Attys.

(No Model.) 6 Sheets—Sheet 6.

W. P. THEERMANN.
PULSATING STEAM PUMP.

No. 452,400. Patented May 19, 1891.

WITNESSES
William H. Taylor
Joseph Benton

INVENTOR
Wm. P. Theermann
by Wm. P. Thompson & Co.
Attys.

UNITED STATES PATENT OFFICE.

WILLIAM P. THEERMANN, OF SALFORD, ASSIGNOR OF ONE-HALF TO JOHN BURFORD FOXWELL, OF MANCHESTER, ENGLAND.

PULSATING STEAM-PUMP.

SPECIFICATION forming part of Letters Patent No. 452,400, dated May 19, 1891.

Application filed September 9, 1890. Serial No. 364,477. (No model.)

*To all whom it may concern:*

Be it known that I, WILLIAM PAUL THEERMANN, of Salford, in the county of Lancaster, England, a subject of the Emperor of Germany, have invented certain new and useful Improvements in Pulsating Steam-Pumps, of which the following is a specification.

This invention relates to that class of pumps or apparatus for raising and forcing water or other liquids formed with two or more (preferably two or four) working-chambers, in which alternately the steam acts direct upon the water to discharge it and is then condensed, forming a vacuum within the chamber, whereby the water is raised through the suction-pipe and valves to again fill the chamber, which is well known under the names of the "pulsometer" or "pulsating steam-pumps."

The invention is designed to effect several improvements in the apparatus, whereby greater simplicity in construction and greater efficiency in working will be effected, while at the same time it is considered that the cost of production will be reduced.

It consists, essentially, in constructing the apparatus with a steam-valve in the form of two hemispheres, half-balls, or other convex bodies of oval egg shape or other similar form divided in two, connected at their convex surfaces, resting upon a central rib or lugs, upon which it oscillates, the two flat or concave sides forming the valve-faces, with the suction and delivery valves formed with a grid or grating of an ordinary form to let into or fit loosely a conical or stepped chill-cast opening in the base of the chamber without any packing and held in position by a central stud or pin, which carries or holds an ordinary disk-valve of rubber or other suitable material, the disk-valve having a seating on the casting beyond the conical or stepped opening and covering the joint made therein with the grating, with an inclined partition or shelf extending or projecting part way across the bottom part of each working-chamber to effect a more rapid condensation of the steam, and, in the case of a four-cylindered apparatus, constructing it with a common discharge-chamber and a common inlet or suction chamber connected together by a conical pipe or nozzle rising from one into the other and with passages communicating with each pair of chambers to control or regulate the discharge to prevent back-pressure.

The invention will be fully described with reference to the accompanying drawings, in which—

Figure 2:
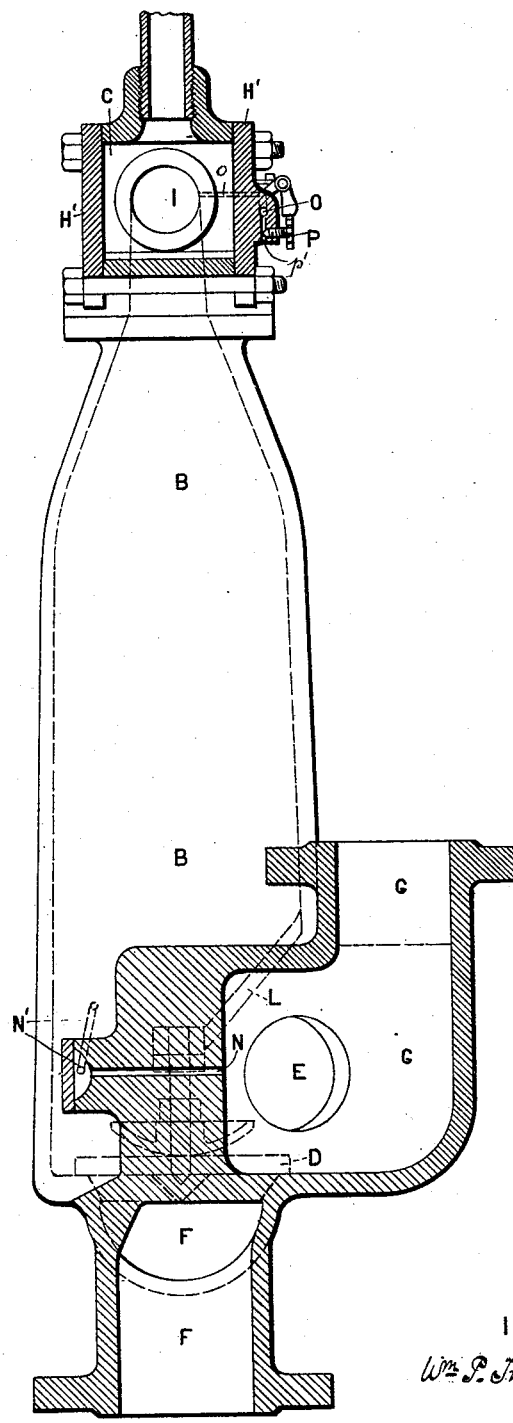
Figure 3:
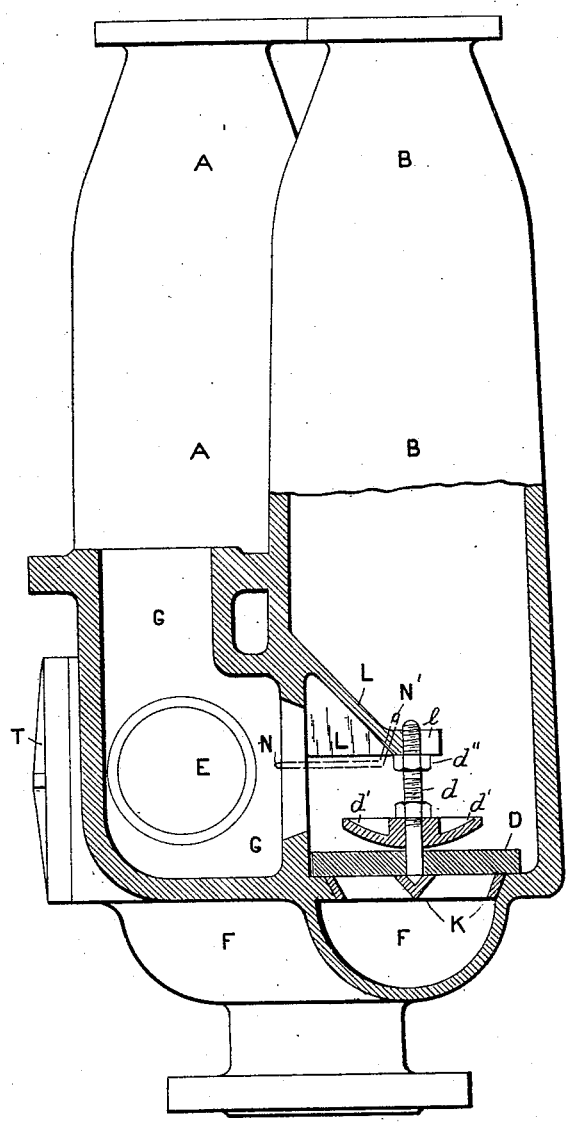
Figure 4:
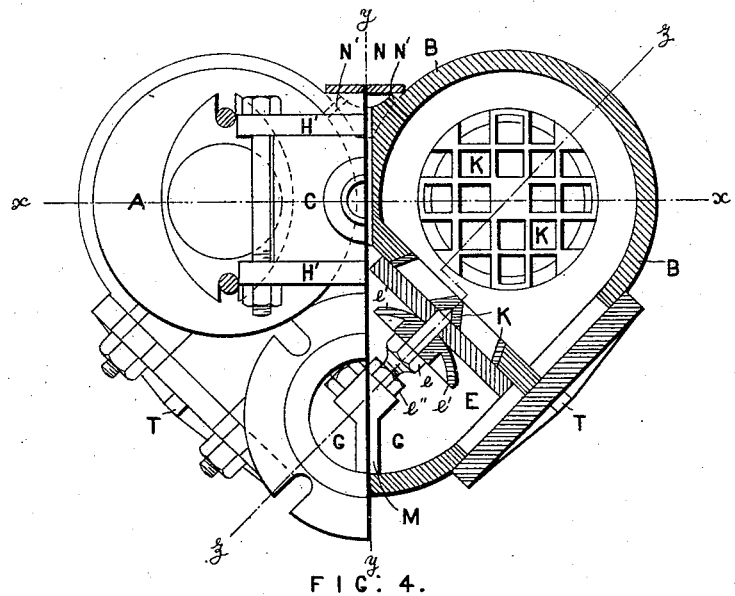
Figure 7:
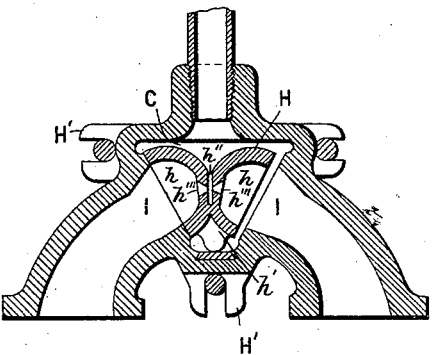
Figure 5:
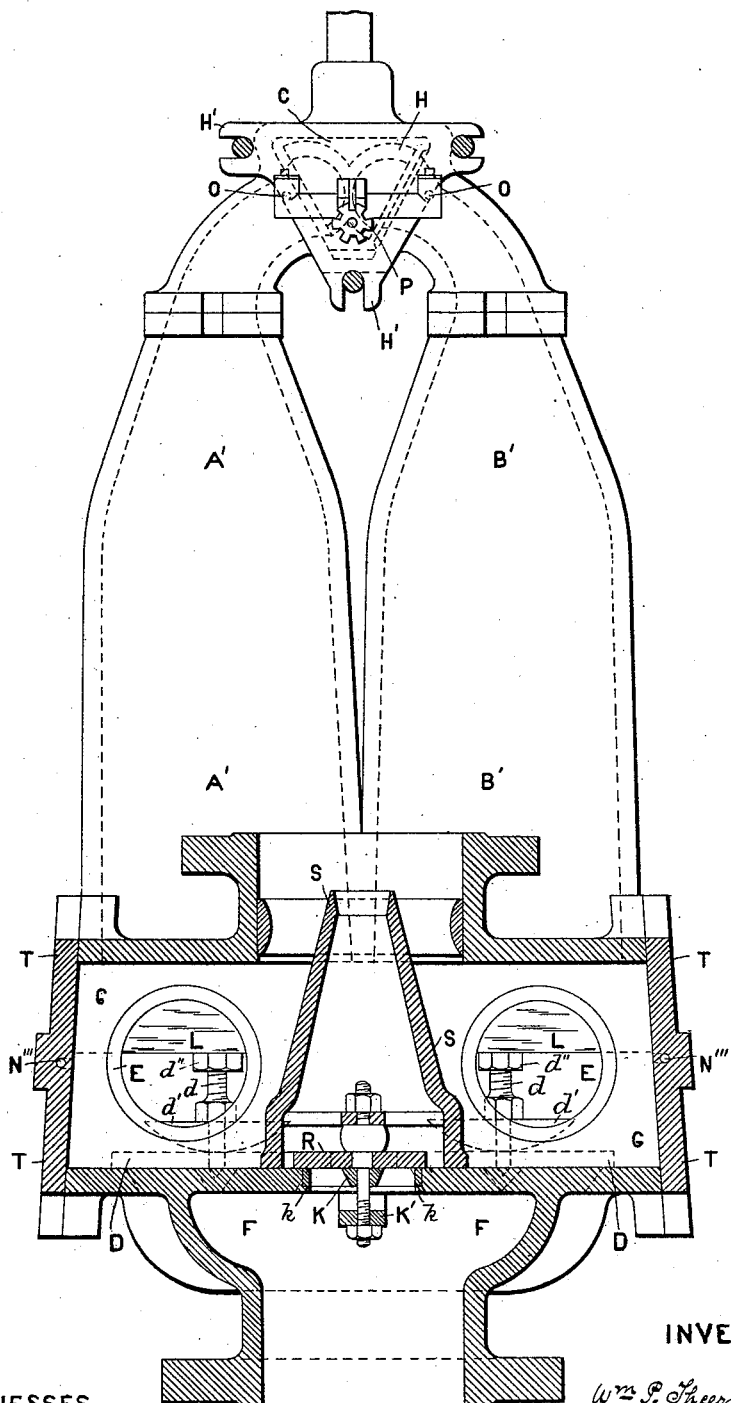
Figure 6:
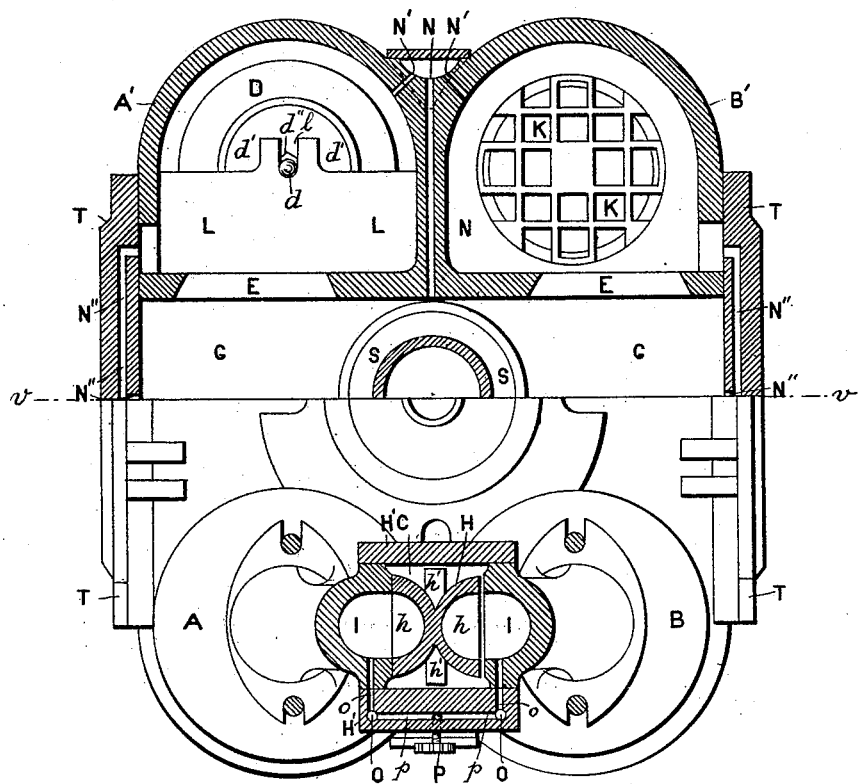

Figure 1 is an elevation, part in section, on line $x\,x$, Fig. 4, of pulsometer constructed in accordance with this invention; Fig. 2, a sectional elevation on line $y\,y$; Fig. 3, a sectional elevation on line $z\,z$; Fig. 4, a plan, part in section; Fig. 5, an elevation of four-chambered apparatus, part in section on line $v\,v$, Fig. 6; Fig. 6, a plan, part in section, of Fig. 5; Fig. 7, a sectional elevation of valve-chest and steam-admission valve adapted for use of exhaust-steam; Fig. 8, an elevation of valve H.

The two working-chambers A and B are of any ordinary form, preferably circular in cross-section and tapering toward the top, and are connected together at the top in the usual way by means of a valve chamber or chest C, and are fitted at the base with water-valves D and E for suction and delivery, one opening into an inlet-chamber F and the other into the discharge-chamber G. The steam-valve H, which is placed in the valve-chamber C and controls the admission of steam to working-chambers A and B, is formed of two hemispheres or half-balls $h$, joined together at their back or convex surfaces. Each of the semi-spherical parts $h$ of the valve may be concave, as shown, or may be solid with a flat face. We prefer, however, the concave form. The concave or flat face of the valve H finds a seating over the ports I in the upper end of each of the working-chambers A and B. On the under side of the steam-valve H midway between the two parts $h$ projects a rib or lugs $h'$, upon which it rests and oscillates between the valve-seats over the ports I, opening and closing them alternately. Instead of being formed from the halves of two exact spheres, the valve H may be constructed from a convex body of oval form or egg shape with the two parts connected together in the way described. This form of valve offers less obstruction or resistance to the steam and allows the valve to change from one side to the other quicker. The steam as it enters the valve-chamber impinges upon the valve between the two spherical surfaces, and the position of the valve allows the steam to act on one surface, assisting the valve to change quickly to the opposite seating, the other spherical surface presenting the best form, offering least resistance to its movement. By my arrangement I combine the advantages of the ball-valve, which offers but little resistance to the passage of steam down and around it, and also the advantages of an oscillating valve with a top upon which the impact of the incoming current of steam acts to assist the change of the valve from one seating to the other.

When intended to be used with exhaust-steam or steam at a very low pressure, the valve is formed with a vertical passage $h''$, extending from the top of the valve between the two semi-spherical parts $h$ down to meet a horizontal cross-passage $h'''$, leading from the interior cavity of the one part into that of the other part. The cross-passage $h'''$ is of double V shape, or of V shape at each opening, to allow for rapid expansion of steam as it is passed through. Through these passages a small quantity of the exhaust or low-pressure steam is admitted into the working-chamber after the valve II has closed the admission of steam to that chamber. By this means a sufficient vacuum is produced to insure the complete filling of the chamber with water.

The inlet and discharge water valves D and E are each formed with a grid or grating K, which is fitted into a conical or stepped opening formed in the casting and preferably chilled. The grid fits loosely into the conical opening, bearing at three or more points to make it steady; but a tight joint is not formed and no packing or close fitting is employed, and the disk-valve I form to extend over the grid K to a seating on the chill-casting, completely covering its joint with the grid. The disk-valve D or E is held in position by a central bolt or stud $d$ or $e$, carrying a guard $d'$ or $e'$. The stud $d$ of the inlet-valve D fits into a hole in or bears upon the top of the center of the grid K at one end, and at the other carries a nut $d''$, which is caused to abut against the under side of a shelf or projection L, (hereinafter described,) in a slot $l$ in which the end of the stud projects. The discharge-valve E is held in position in a similar way by the stud $e$, bearing against the projecting piece M, nut $e''$ acting in a similar way to the nut $d''$, and the grating is effectually clamped in place and the disk-valve also retained. Instead of this arrangement the grid or grating K and the disk-valve and guard may be held in position by means of a central bolt passing through the grating from the valve side to the other side and there secured by a clamp K', similar to what are ordinarily applied for securing man-hole doors, as shown in connection with valve R, Fig. 5.

The grid K, instead of fitting into a conical hole or recess in the casting, may be fitted into a cylindrical recess with a flange or step $k$. The india-rubber disk of the valve in this form, as in the other, extends and has its seating beyond the limits of the grid K, covering the joint made by it, as shown at valve R, Fig. 5.

In order to effect the instantaneous condensation of the steam in each working-chamber A or B when the water has been forced out of it down to the working-level, there is formed or placed an inclined projection or shelf L, extending from one side to about the center line of each chamber, the lower edge being about level with the center of the discharge-valve. At this level there is also formed a passage or port N, leading from the discharge-chamber into and joining a passage or port N' from one working-chamber to the other. When the water has been forced down in one of the working-chambers below the shelf L, a certain amount of water that has been held up by the pressure of the steam under the shelf L falls and meets the steam, thus forming a partial vacuum, relieving the pressure, and thus causing the valve II to close. A jet of water is then projected either from one chamber into the other through the passage N' or from the discharge-chamber by the passage N, or from both, and by these means the condensation of the steam in the working-chamber is almost instantaneously effected.

The valves O for the admission of air into the working-chambers are placed on the side of the steam-valve chest with ports $o$, leading through the sides thereof into the interior of the working-chambers A and B. The admission of a small quantity of air into the chamber when full relieves the suction of the steam-valve and allows it quickly to change to the port of the opposite chamber. The air admitted on top of the water before the discharge commences forms a cushion between the steam and water, which prevents the steam condensing before required. The air-passages $p$, leading to the valves O, are controlled by a single set-screw P, by which the area of the small inlet-passage $p'$ may be diminished or increased. The head of the screw P is preferably notched, and a small pawl or tumbler fits therein to prevent it being accidentally or unintentionally turned. By placing the air-admission valves O in the position stated it is less liable that any water will reach them, which will be of great advantage when pumping dirty water, and by controlling the air-admission by one set-screw the amount of air admitted to both working-chambers will be equal.

In four chambered pulsating steam-pumps the several parts already described are so constructed and each pair of chambers A B and A' B' are connected together at top and fitted with steam-valves H, as already described. The inlet-valves D of the four chambers (see Figs. 5 and 6) lead into one common inlet-chamber F, situated at the lower part of the four chambers, and the discharge-valves E lead into one common discharge-chamber G. The inlet-chamber F is connected with the discharge-chamber G by a valve R, opening into the discharge-chamber. Over the valve R is placed a conical pipe or nozzle S, rising from the bottom of the discharge-chamber G into the delivery-pipe. The flow and velocity of the discharge-water around this conical pipe or nozzle S acts as an ejector to reduce the pressure at the mouth and within the conical pipe to almost or even below atmospheric pressure, while the flow and velocity of the water in the suction-pipe, also having an upward tendency of considerable force, induces the valve R to open and permits water to flow direct from the suction-pipe into the conical pipe S and thence into the delivery-pipe, where it is carried forward with the discharge-water.

In addition to the water-passages already described, N N', between the discharge-chamber G and the working-chambers A and B, water-passages N'' are also provided between the working-chambers A and A' and between the working-chambers B and B', which also communicate with the discharge-chamber. One set of passages which communicate with the discharge-chamber may be dispensed with and the working-chambers used in pairs. The communication between the working-chambers through the passages N'' prevents the opposite chambers discharging at the same time, and so prevents a back-pressure, but insures that the chambers A and B' will be filling while the chambers A' and B are discharging.

The lower part of the two working-chambers A and B and the discharge-chamber G are provided with openings fitted with covers T for the insertion and removal of the inlet-valves D and delivery-valves E. The steam-valve chest is triangular and opens at both sides, so that the valve H may be readily fitted and removed. Two triangular plates H' form covers therefor, one bolted on each side, one of such covers carrying the valves and valve-chambers for the admission of air. By these improvements a more regular and steady flow of water through the suction and delivery pipes is obtained, and thus a more steady and efficient action of the whole apparatus is insured, besides in the case of the four-chambered apparatus having the advantage in the event of an insufficient supply of water being able to shut off two of the working-chambers and performing the work with the remaining two.

What I claim as my invention, and desire to secure by Letters Patent, is—

1. A steam-admission valve for pulsating steam-pumps, formed of two semi-spherical or other convex bodies connected together at their convex sides.

2. In a pulsating steam-pump, the combination of the two semi-spherical bodies $h$ with flat or concave faces which form a steam-admission valve H.

3. In a pulsating steam-pump, the combination, with the two working-chambers, of the two semi-spherical bodies $h$ with flat or concave faces which cover the ports of the chambers to form a steam-admission valve H.

4. In a pulsating steam-pump, the combination of a steam-admission valve H, formed of two semi-spherical hollow bodies $h$, with a vertical steam passage or port $h''$ and a double V-shaped passage $h'''$ through the valve from one side to the other.

5. In a pulsating steam-pump, the combination, with the working-chamber and shelf L, of the central supporting-stud $d$, the disk-valve D, extending to a seating beyond the grid K, and the chilled base or casting of the chamber with a conical opening formed therein.

6. In a pulsating steam-pump, the combination, with each working-chamber, of an inclined shelf or projecting plate, which extends from side to side in one direction and from one side to the center in the contrary direction, substantially as and for the purposes described.

7. In a pulsating steam-pump, the combination, with four or more working-chambers, of a common inlet-chamber and outlet-chamber, and a conical pipe or nozzle leading from the inlet-chamber to the delivery-pipe, substantially as described.

8. In a pulsating steam-pump, the combination, with the four chambers A A' B B', of the chambers F and G, the valve R, and the conical pipe or nozzle S, substantially as described.

9. In a pulsating steam-pump, the combination, with the working-chambers, of water-passages which always connect each working-chamber with the other working-chamber and with the discharge-chamber or delivery-pipe, substantially as described.

10. In a pulsating steam-pump, the combination, with two working-chambers, of two air-valves O, with a single inlet-port and controlled by a set-screw, substantially as described.

11. In a pulsating steam-pump, the combination, with the two working-chambers, the valve-chest, and valve-chest cover H', of the air-valves O, with air-passages $p$, the set-screw P, which regulates the air-admission to both valves, and the pawl or tumbler which engages with the notches in the head of the set-screw, substantially as described.

12. In a pulsating steam-pump, the combination, with the working-chambers, of a triangular-shaped valve-chest, double valve of semi-spherical bodies H, triangular side plates H', with air-passages through into each working-chamber, and air-admission valves O, affixed to the steam-chamber, substantially as described and shown.

In testimony whereof I have signed my name to this specification, in the presence of two subscribing witnesses, this 30th day of August, 1890.

W. P. THEERMANN.

Witnesses:
    I. OWDEN O'BRIEN,
    WILLIAM H. TAYLOR.